July 5, 1955 J. W. DOBLE 2,712,590
PORTABLE HEATER
Filed March 17, 1953 2 Sheets-Sheet 1
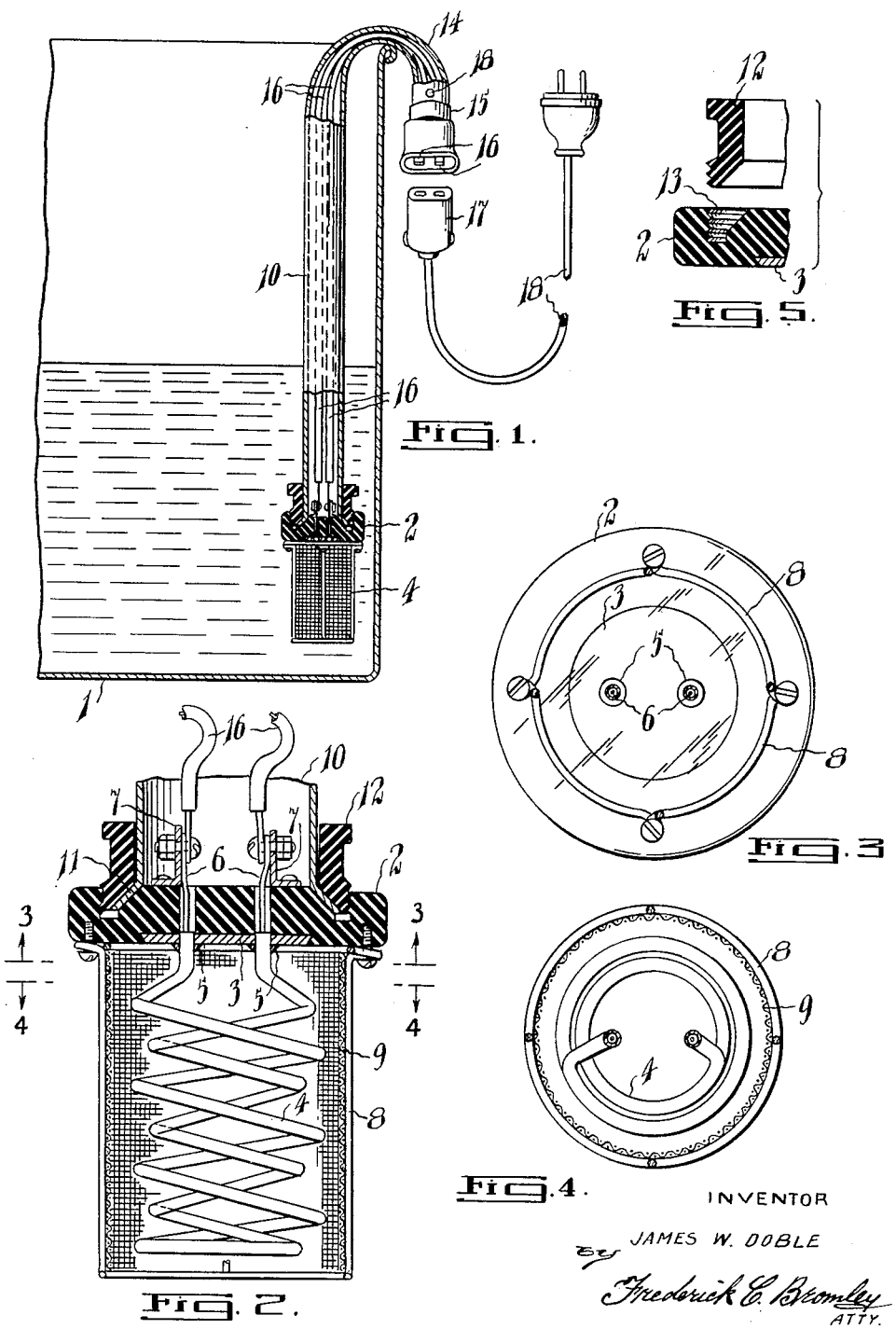
INVENTOR
JAMES W. DOBLE
By Frederick E. Bromley
ATTY.

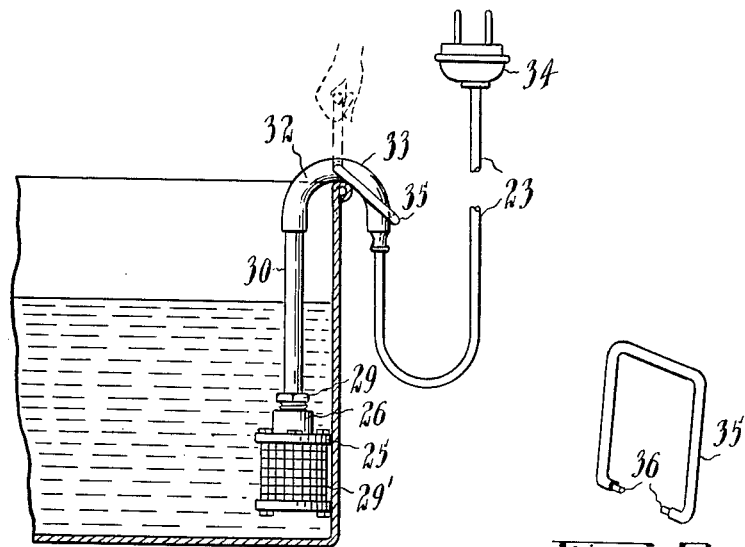
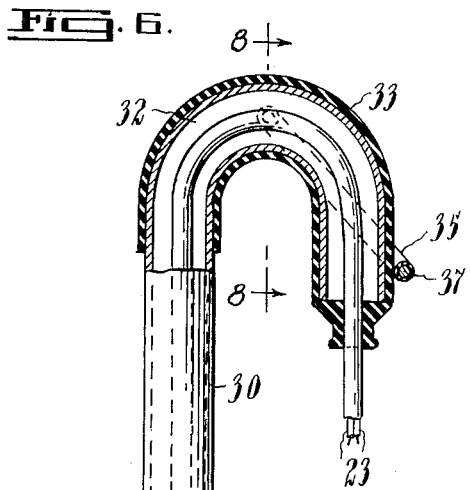
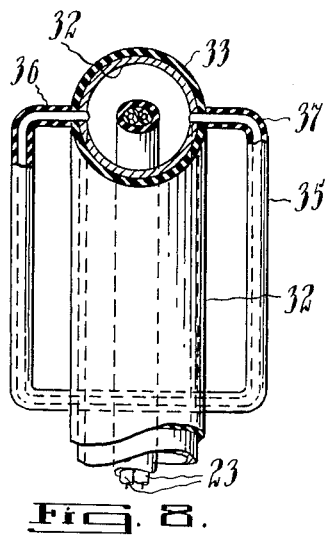
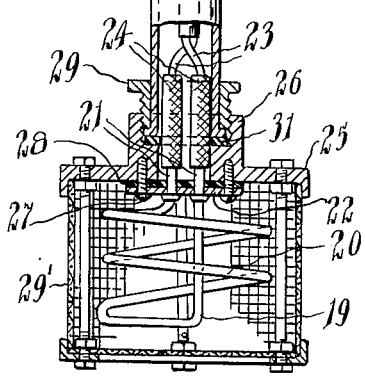

United States Patent Office 2,712,590
Patented July 5, 1955

2,712,590
PORTABLE HEATER

James W. Doble, Oshawa, Ontario, Canada

Application March 17, 1953, Serial No. 342,853

4 Claims. (Cl. 219—41)

This invention relates to electric heaters intended particularly for heating water. Many dwelling houses, apartment houses and other buildings are provided with a supply of hot water from a heated storage tank. In many cases and at certain times there is often an excessive demand for hot water with the result that the water is not sufficiently hot for washing clothes, bathing or other purposes, and consequently additional water requires to be heated in a kettle or other vessel, which additional water has to be subsequently transferred to the bowl of the washing machine, bath tub or other container, with the consequent danger of spilling or splashing the water and possibly scalding the person.

The object of the present invention therefore is to devise a portable electric heater which may be directly immersed in the water in a washing machine tub or bowl, a bath tub or other container, to bring the water to the required temperature, and thus avoid having to transfer the water from one vessel to the bowl or tub in which it is used, and, when the water is sufficiently heated, the heater may be readily removed.

A further object is to device a heater which is effectively protected from the entrance of moisture and in which the parts by which it is carried are well heat insulated from the heating element.

A still further object is to devise a heater which is simple in construction and easy to assemble.

These and other objects which will hereinafter appear are attained by means of the constructions hereinafter described and illustrated in the accompanying drawings in which:

Fig. 1 is an elevation, partly in section, of the improved heater mounted in the tub or bowl of a washing machine;

Fig. 2 is an enlarged vertical section of the heater;

Fig. 3 is a cross section on the line 3—3 in Fig. 2;

Fig. 4 is a cross section on the line 4—4 in Fig. 2;

Fig. 5 is an enlarged sectional detail of the heater head and securing ring in separated relationship;

Fig. 6 is a similar view to Fig. 1 but depicts a modified form of the heater;

Fig. 7 is a partly sectioned vertical view of the modified form of heater on an enlarged scale;

Fig. 8 is a cross section on line 8—8 of Fig. 7; and

Fig. 9 is a perspective view of the handle or bail of the modified form of heater.

In the drawings like numerals of reference indicate corresponding parts in the different figures.

The preferred form of the invention, Figs. 1–5, will be first described.

In Fig. 1, 1 indicates a tub or bowl such as used on a washing machine, which tub or bowl contains the water to be heated. The heater of the present invention is intended to be hung or suspended from the upper edge of the side wall of the tub or bowl.

The heater comprises a head 2. For simplicity of construction the head is made of an electrically insulating material, but it is also desirable that the material should have certain other characteristics as well. The head should be formed of a material which is moisture-proof and capable of forming a seal against the passage of moisture. The material should also have the faculty of tending to retard the transfer of heat, and further the material should preferably have at least some resilience. Suitable materials which have these characteristics are vulcanite or other hard rubber and some plastic compositions.

The head 2 has imbedded in its under surface a metal disk or plate 3. The material of the head is preferably molded about the plate to form a substantially unitary construction but may be otherwise united if so desired. The edge of the plate 3 is shown as bevelled to increase the security of engagement.

The sheathed heating element 4 is shown as of the metal tube type in which the resistance wire 6 is imbedded in a suitable insulating material and surrounded by a rigid-wall tube. The tube part of the heating element 4 is bent into a spiral shape, and the plate 3 has a pair of holes formed therein into which project the ends of the tube. The tube and plate are secured to each other by welding 5. This welding not only holds the sheathing tube of the heating element 4 firmly in place relative to the plate, but provides an effective water seal as well.

The terminals of the resistance wire 6 extend through holes in the head 2 and are connected to contact posts 7 mounted on the top of the head 2.

The sheathed heating element 4 is protected by a guard depending from the under side of the head 2. The guard desirably comprises a metal frame 8 of wire rod material which supports a woven wire screen 9.

The heater is mounted on the lower end of a supporting tube 10. The lower end of this tube is outwardly flared to form a flange 11, and this flange extends into an annular recess 13 in the top of the head 2. In this recess there is provided a truncated conical seating face.

The flange 11 is held in the recess by a securing ring 12 sleeved on the lower end of the tube 10 and extending into the recess. This ring is threaded on its outer periphery, while the wall of the head forming the outer periphery of the recess 13 is correspondingly threaded, as illustrated in Fig. 5. The securing ring is preferably made of the same material or material having the same characteristics as the material of the head 2.

The said seating face of the recess 13 and the wall of the ring 12 are shaped to clamp between them the flange 11 and thus provide a moistureproof joint.

The upper end of the supporting tube 10 is bent to form a hook 14. The end of the tube 10 has an end electric terminal 15 mounted thereon which is shown as of the two prong plug type. Conductors 16 of the insulated wire type extend through the tube 10 to connect the terminals of the resistance wire 6 with the prongs of the plug 15. For protective purposes, the end terminal 15 is provided with a shroud or sleeve 16 to receive the end of the socket member 17 of an extension cord 18, which is preferably of a suitable insulating material. The tube 10 is provided with an air vent 18.

As water will ordinarily heat quicker if the tub or bowl is covered, the tube 10 at the top of the hook 14 is preferably flattened to an elliptical shape in cross section as shown. When the cover is placed over the tub the gap between the upper edge of the tub and the cover at the heater side will thus be considerably less than if the tube was circular at this location, and consequently will more effectively prevent the escape of heat.

The hook 14 is so proportioned that the heater, when hanging in a washing machine tub as indicated in Fig. 1, will be spaced from the wall of the tub. Should, however, the heater contact the wall of the tub, the engagement would be with the insulating head 2, and, therefore, there would be a minimum amount of heat transferred to the tub wall.

It will be seen that a heater has been devised which will effectively heat water while in the container in which it is to be used, and which can be readily removed when the water is heated to the desired degree. The structure provides a heater which is efficiently protected from moisture, and one in which the heating element is adequately protected from dangerous contact.

Adverting to the modification shown in Figs. 6—9 inclusive, this arrangement is somewhat similar and comprises a sheathed embedded-resistor heating element 19 whose sheath is a rigid walled tube 20 of spiral or other configuration having terminal ends 21 welded to an attachment plate 22. The said terminal ends 21 extend upwardly through holes in plate 22, and the terminals of the contained resistance element (not shown) are connected to the insulated conductors 23 in known manner, the connection being covered by insulation, indicated at 24.

The head 25 is a metal member and has a hollow boss 26 through which the flexible conductors 23 extend in cable form. Plate 22 is fastened by screws 27 to said head, and the connection is rendered water-tight by an interposed gasket 28. A reticulate guard 29' is attached to said head to surround the heating element aforesaid.

The upper end of the boss 26 is internally enlarged and screw threaded to take the nut 29. This nut encircles the hanger tube 30 and clamps the flanged end of the tube in the boss, and a water-tight connection is made by the use of a compressible gasket 31.

The crook 32 of the hanger tube is encased in a rubber jacket 33 and at the end of the crook or hook the jacket is reduced to seal the opening and to fit tightly about the conductor cable. The cable extends for a suitable length beyond the hanger tube for making an electrical connection with an outlet receptacle of a service line. A standard plug 34 on the cable is used to make the electrical connection with the outlet receptacle.

A feature of the hanger structure is that a bail or handle 35 is provided on the crook portion for lifting and carrying the heater. Said bail is a C-shaped member of springy metal having inwardly directed ends 36 sprung into diametrical holes provided in the bight 32. Said bail desirably has a rubber or plastic covering 37. The bail extends transversely and is swingable to a position of rest when not in use.

The advantages and utility of the construction will be clearly understood from the preceding disclosure.

What is claimed is:

1. A portable heating device of the kind described comprising a heating element having metal clad terminals, a metal plate forming a support for said heating element and having the said terminals passing therethrough, the metal sheaths of said terminals being bonded so as to be integral mechanically with the structure of said plate, a head member bonded to said plate to provide a gas proof joint therebetween, a tubular conduit having one end flared forwardly and outwardly, a recess in the terminal side of said head contoured to co-act with the inner surface of said flared end, and having screw-threads in its inner side walls, a securing ring contoured on its inner wall to co-act with the outer surface of said flared end and having threads upon its outer wall designed to mesh with the threads in said head, the tubular conduit being turned over near its other end to form a hook for hanging said heating element captive to the edge of a specified vessel containing a substance to be heated thereby, and electricity supply cable means passing through said conduit to the live terminals of said heater.

2. A construction in accordance with claim 1 wherein the said tubular conduit is flattened at least over the portion comprising the said hook.

3. A construction in accordance with claim 1 wherein the said head member is comprised of dielectric material moulded onto said plate to provide a gas proof barrier between said terminals on one side of said head member and said heating element on the other side thereof.

4. A construction in accordance with claim 1 wherein the hook portion of said tubular conduit includes a bail handle pivoted transversely at the mid-point of the curved portion of said conduit.

References Cited in the file of this patent

UNITED STATES PATENTS

| | | |
|---|---|---|
| 1,222,669 | Purnell | Apr. 17, 1917 |
| 1,401,686 | Frei | Dec. 27, 1921 |
| 1,416,872 | Quain | May 23, 1922 |
| 1,483,564 | Wickes et al. | Feb. 12, 1924 |